(12) United States Patent
Cho et al.

(10) Patent No.: US 7,738,027 B2
(45) Date of Patent: Jun. 15, 2010

(54) AUTO FOCUS METHOD AND ELECTRIC DEVICE USING THE SAME

(75) Inventors: Ching-Yuan Cho, Guang Dong Province (CN); Feng-Keng Chen, Changhua County (TW)

(73) Assignee: Asia Optical Co., Inc., Taichung (TW)

( * ) Notice: Subject to any disclaimer, the term of this patent is extended or adjusted under 35 U.S.C. 154(b) by 926 days.

(21) Appl. No.: 11/426,364

(22) Filed: Jun. 26, 2006

(65) Prior Publication Data

US 2006/0290805 A1 Dec. 28, 2006

(30) Foreign Application Priority Data

Jun. 27, 2005 (TW) .............................. 94121402 A

(51) Int. Cl.
*H04N 5/232* (2006.01)

(52) U.S. Cl. ..................................... 348/345

(58) Field of Classification Search ................. 348/345, 348/349, 354, 347
See application file for complete search history.

(56) References Cited

U.S. PATENT DOCUMENTS

| 4,903,134 | A |  | 2/1990 | Murashima et al. |
| 5,235,428 | A |  | 8/1993 | Hirota et al. |
| 5,249,058 | A | * | 9/1993 | Murata et al. ............... 348/354 |
| 6,130,417 | A | * | 10/2000 | Hashimoto ............... 250/201.2 |
| 7,298,413 | B2 | * | 11/2007 | Kajiyama .................... 348/349 |
| 7,420,612 | B2 | * | 9/2008 | Tsujino ...................... 348/365 |
| 7,486,330 | B2 | * | 2/2009 | Sawachi ..................... 348/345 |
| 2002/0012063 | A1 | * | 1/2002 | Kobayashi .................. 348/345 |
| 2003/0197803 | A1 | * | 10/2003 | Watanabe et al. ........... 348/345 |

FOREIGN PATENT DOCUMENTS

| JP | 2004325517 A | * | 11/2004 |
| TW | 172155 |  | 4/1979 |

* cited by examiner

*Primary Examiner*—Jason Chan
*Assistant Examiner*—Gary C Vieaux
(74) *Attorney, Agent, or Firm*—Thomas, Kayden, Horstemeyer & Risley

(57) ABSTRACT

An auto focus method. A step length for a driving motor and a track length are defined and a storage medium is provided. The driving motor is shifted to an initial position and the storage medium is cleaned. The driving motor sequentially shifts a focus lens to a plurality of sampling positions based on the step length. A plurality of evaluation values corresponding to each sampling position and a plurality of step lengths corresponding to each evaluation value for a desired image are recorded in the storage medium. A weighted average is calculated according to the evaluation values and the step lengths recorded in the storage medium using a statistical formula. The driving motor shifts the focus lens to a focus position according to the weighted average.

9 Claims, 7 Drawing Sheets

AUTO FOCUS METHOD AND ELECTRIC DEVICE USING THE SAME

BACKGROUND OF THE INVENTION

1. Field of the Invention

The invention relates to auto focus methods, and more particularly, to methods of shortening focus time using image evaluation values.

2. Description of the Related Art

Conventionally, auto focus methods implement processes according to generated evaluation values corresponding to desired image signals. This requires shifting a lens module repeatedly back and forth for coarse overall scanning and fine scanning, thus obtaining evaluation values corresponding to each focus location. According to focus modes, analyses and comparisons are performed to locate an optimum focus location, thereby shifting the lens module to the optimum focus location. Driving a motor repeatedly to carry the lens module wastes time and increase wear on the motor and transmission components thereof. If a resulting image is adequately focused, repeat focus processes waste even more time.

Evaluation values utilized comprise high frequency components (HFC), generated by images passing a band-pass filter (BPF) or high-pass filter (HPF). An evaluation curve generates a relatively maximal (or minimal) evaluation value when a zoom lens shifts, such that a focus location corresponding to the evaluation value acts as the focal point. Due to unsatisfactory slope values of the evaluation curve, it can be difficult for conventional auto focus methods to obtain the relatively maximal (or minimal) evaluation value due to the external factors, such that the optimum focus location cannot be located. In actual focus processes for a zoom lens, different zoom ratios result in discrepancies in evaluation distribution.

When a zoom lens shifts to a telephotographic or pantoscopic mode, problems occur if the size of a viewscreen corresponding to a focus region is fixed, such as generation of a large peak value with a steep curve when the zoom lens shifts to a telephotographic location, as shown in FIGS. 1A and 1B. Accordingly, a small peak value with a smooth curve may be generated when the zoom lens shifts to a pantoscopic location, as shown in FIGS. 1C and 1D.

One solution is design of a special filter for a specific hardware device, as disclosed in Taiwan patent No. 172155. An auto focus device of the disclosure maintains a slope value of an evaluation curve based on a fixed size of a viewscreen using high frequency components obtained through multiple high frequency filters, thus locating a focal point of the auto focus device.

Additionally, two focus control circuits can be utilized. As disclosed in U.S. Pat. No. 4,903,134, in an automatic focus circuit of a video camera, automatic focus is performed by a focus evaluation value generated in response to a video signal obtained by an image sensing circuit. A first focus motor control circuit controls the rotation of a focus motor so that a focus lens is fixed once in the position where the focus evaluation value takes the maximal value. A second focus motor control circuit changes the focus motor, by a minimum predetermined amount, to determine the slope of the focus evaluation value, which change is repeated until inversion of the slope, that is, the maximal point is detected. As a result, the position of the focus lens is corrected at the maximal point of the focus evaluation value. When the correction amount exceeds a predetermined value, first automatic focus by the first focus motor control circuit is resumed.

Further, as disclosed in U.S. Pat. No. 5,235,428, in an auto focus system, a focus detection signal is generated from a video signal produced by a video camera by deriving higher frequency components of the video signal, detecting when the higher frequency components exceed a minimal threshold, sensing when the video signal exceeds a maximal threshold, and integrating the higher frequency components which exceed the minimal threshold, except during an interval when the video signal exceeds the maximal threshold, thereby producing the focus detection signal.

Additionally, as shown in FIG. 2, a schematic diagram of a curve generated using a mount-climbing focus method, a peak value of a curve is obtained using an asymptotic approximation method. The curve similar to that shown in FIGS. 1B and 1D is generated according to HFC accumulation values (i.e. evaluation values) by different focal lengths. A peak value corresponding to a maximal evaluation value on the curve corresponds to a true focal point. Defined images for a focus process depend on the highest point on the curve to be located. If the steep or smooth state described occurs, location of the peak value takes longer and even the peak value may never be ascertained.

Details of the mount-climbing focus method are further described in the following. Referring to FIG. 2, the X axis indicates focus locations (FL) and the Y axis indicates high frequency components of image signals. A start focus location is point A, and a focus motor is driven to point B (if the current direction of the motor is forward). If the high frequency component at point B exceeds the component at point A, the motor is driven to point C in the forward direction. If the high frequency component at the point C exceeds the component at point B, the motor is further driven to point D in the forward direction. As shown in FIG. 2, the high frequency component at point D is smaller than the component at point C, indicating the image captured at point C is clearer than the image captured at point D, such that the motor is reversed to point F. If the high frequency component at point E exceeds the component at point C, the motor is further reversed to point F. If the high frequency component at point F is smaller than the component at point E, the motor is further driven to point G in the forward direction. The motor is repeatedly driven back and forth to approximate the high frequency components to locate the relatively highest point on the curve, thus obtaining the maximal high frequency component. During the approximation process, if the curve shown in FIG. 2 is steep or smooth as the curve shown in FIG. 1B or 1D, and if the motor is only driven by a smaller unit distance, the maximal high frequency component is difficult to locate, thus increasing focus time.

Additionally, another auto focus method drives a motor in seven steps as unit distances, obtaining high frequency components corresponding thereto. When all the high frequency components are obtained, a single-step method is implemented to one unit distance comprising the maximal high frequency component, thus obtaining a real maximal high frequency component. A drawback of the method is implementation of search operations to a length of a focus track only if search operations implemented in the entire focus track have been completed, requiring much time.

While the mount-climbing focus method is simple and can rapidly locate a focal point, repeated driving the motor back and forth to obtain the focal point costs much time. Thus, an improved auto focus method with shortened focus time is desirable.

BRIEF SUMMARY OF THE INVENTION

An auto focus method is provided. In an embodiment of such a method, a step length for a driving motor and a track length are defined and a storage medium is provided. The driving motor is shifted to an initial position and the storage medium is cleaned. The driving motor sequentially shifts a focus lens to a plurality of sampling positions based on the step length. A plurality of evaluation values corresponding to each sampling position and a plurality of step lengths corresponding to each evaluation value for a desired image are recorded in the storage medium. A weighted average is calculated according to the evaluation values and the step lengths recorded in the storage medium using a statistical formula. The driving motor shifts the focus lens to a focus position according the weighted average.

An embodiment of the auto focus method further shifts the focus lens to a first sampling position according to step length using the driving motor and records a first evaluation value corresponding to the first sampling position and a first step length based on the step length for the desired image in the storage medium, determines whether the total shift distance is less than the track length, and if so, shifts the focus lens to a subsequent sampling position using the driving motor. The subsequent evaluation value corresponding to the subsequent sampling position and the subsequent step length based on the step length for the desired image are recorded in the storage medium, and, if the total shift distance is not less than the track length, the weighted average is calculated according to evaluation values and corresponding step lengths recorded in the storage medium using the statistical formula.

An embodiment of the auto focus method further records a plurality of evaluation values corresponding to each sampling position for the desired image in the storage medium, selects a plurality of evaluation values and step lengths corresponding to a predetermined number of sampling positions prior to and following a sampling position, respectively, corresponding to a maximum evaluation value, and calculates the weighted average according to the selected evaluation values and step lengths using the statistical formula.

Also disclosed is another auto focus method. In an embodiment of such a method, a lens module is shifted to a plurality of sampling positions based on a predetermined step length using a driving motor. A plurality of evaluation values corresponding to the sampling positions is obtained. The evaluation values and step lengths corresponding thereto are recorded. A weighted value is assigned to each corresponding step length respectively according to the evaluation values. The evaluation values and the weighted step lengths are calculated to obtain an optimum focus position.

An auto focus device is provided. An embodiment of such a device comprises a storage medium, a lens module, a driving motor, an image sensor, and a digital signal processing unit. The driving motor shifts the lens module on a focus track based on a predetermined step length. The image sensor obtains evaluation values corresponding to a desired image through the lens module. The digital signal processing unit shifts the driving motor to an initial position, cleans the storage medium, sequentially shifts the lens module to a plurality of sampling positions based on the step length using the driving motor, records a plurality of evaluation values corresponding to each sampling position and a plurality of step lengths corresponding to each evaluation value for the desired image in the storage medium, calculates a weighted average according to the evaluation values and the step lengths recorded in the storage medium using a statistical formula, and shifts the focus lens to a focus position according the weighted average using the driving motor.

In an embodiment of the auto focus device, the digital signal processing unit further shifts the lens module to a first sampling position according to step length using the driving motor, recording a first evaluation value corresponding to the first sampling position and a first step length based on the step length for the desired image in the storage medium, determining whether the total shift distance is less than the focus track length, and if so, shifts the lens module to a subsequent sampling position using the driving motor, recording a subsequent evaluation value corresponding to the subsequent sampling position and a subsequent step length based on the step length for the desired image in the storage medium, and, if the total shift distance is not less than the focus track length, calculates the weighted average according to evaluation values and corresponding step lengths recorded in the storage medium using the statistical formula.

In an embodiment of the auto focus device, the digital signal processing unit further records the plurality of evaluation values corresponding to each sampling position for the desired image in the storage medium, selects the plurality of evaluation values and step lengths corresponding to a predetermined number of sampling positions prior to and following a sampling position, respectively, corresponding to the maximum evaluation value, and calculates the weighted average according to the selected evaluation values and step lengths using the statistical formula.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1B:
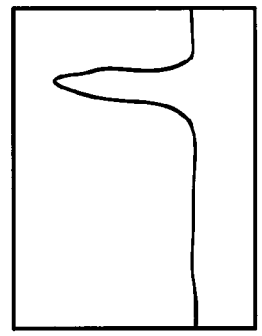
FIGS. 1A and 1B are schematic views of an evaluation curve as a zoom lens shifts to a telephotographic location.
Figure 1A:
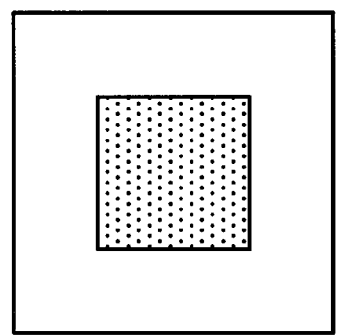
Figure 1C:
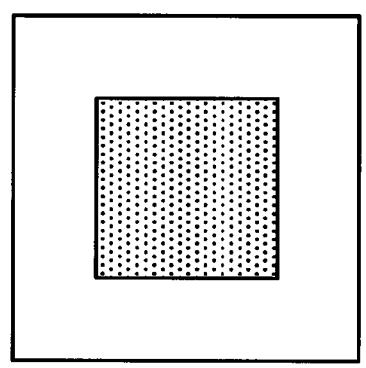
FIGS. 1C and 1D are schematic views of an evaluation curve as a zoom lens shifts to a pantoscopic location.
Figure 1D:
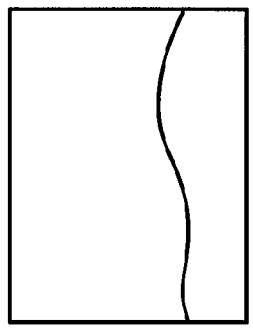
Figure 2:
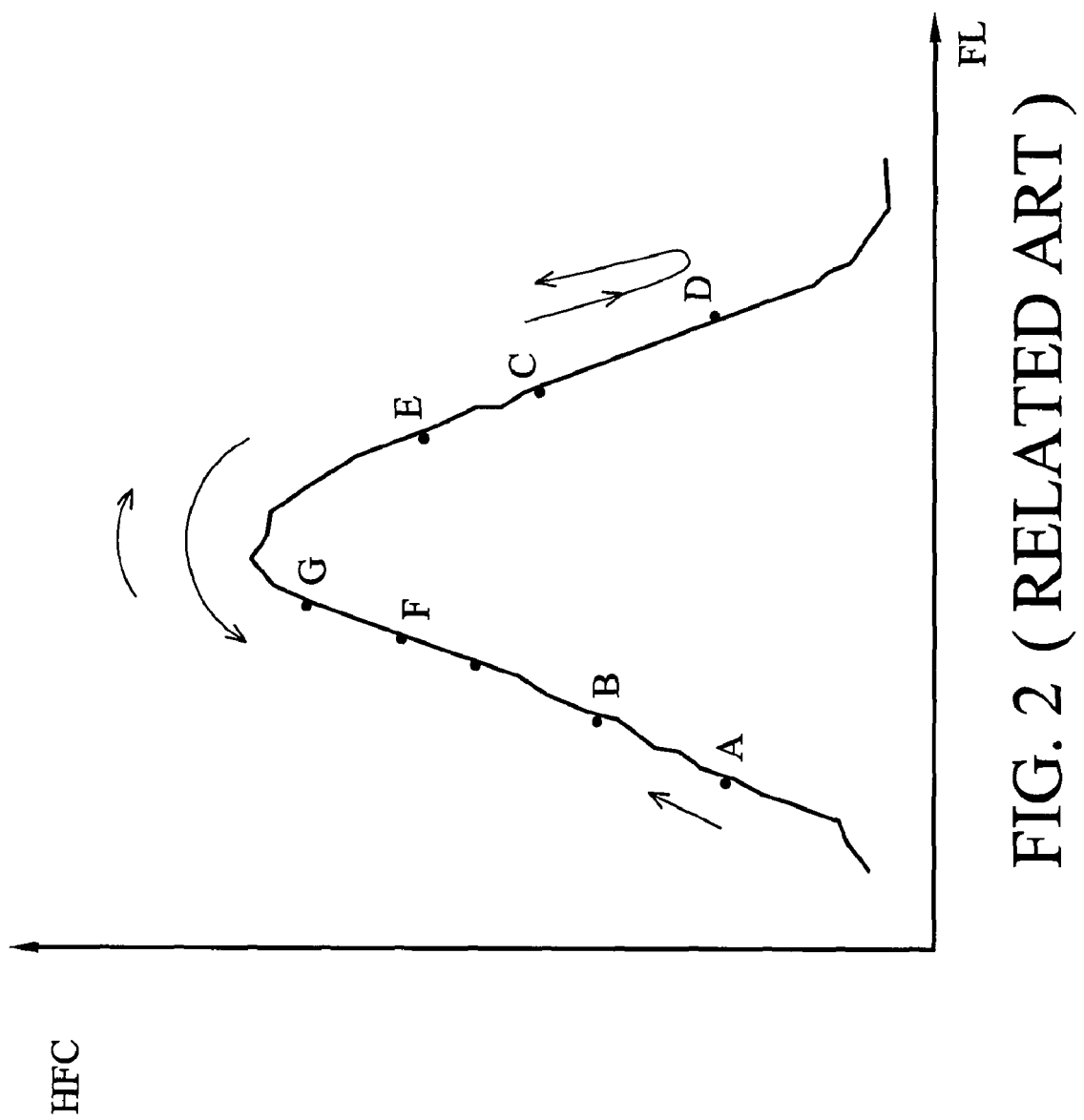
FIG. 2 is a schematic diagram of a curve generated using a mount-climbing focus method.

Several exemplary embodiments of the invention are described with reference to FIGS. 3 through 6, which generally relate to auto focus methods. It is to be understood that the following disclosure provides many different embodiments as examples, implementing different features of the invention. Specific examples of components and arrangements are described to simplify the disclosure. These are merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

To solve drawbacks in current focus methods, the invention shifts a focus lens by a fixed step length from an initial position (the center position or others) to the entire length of a focus track, records evaluation values and step lengths corresponding to each position, and calculates a weighted average using a statistical formula.

Figure 3:
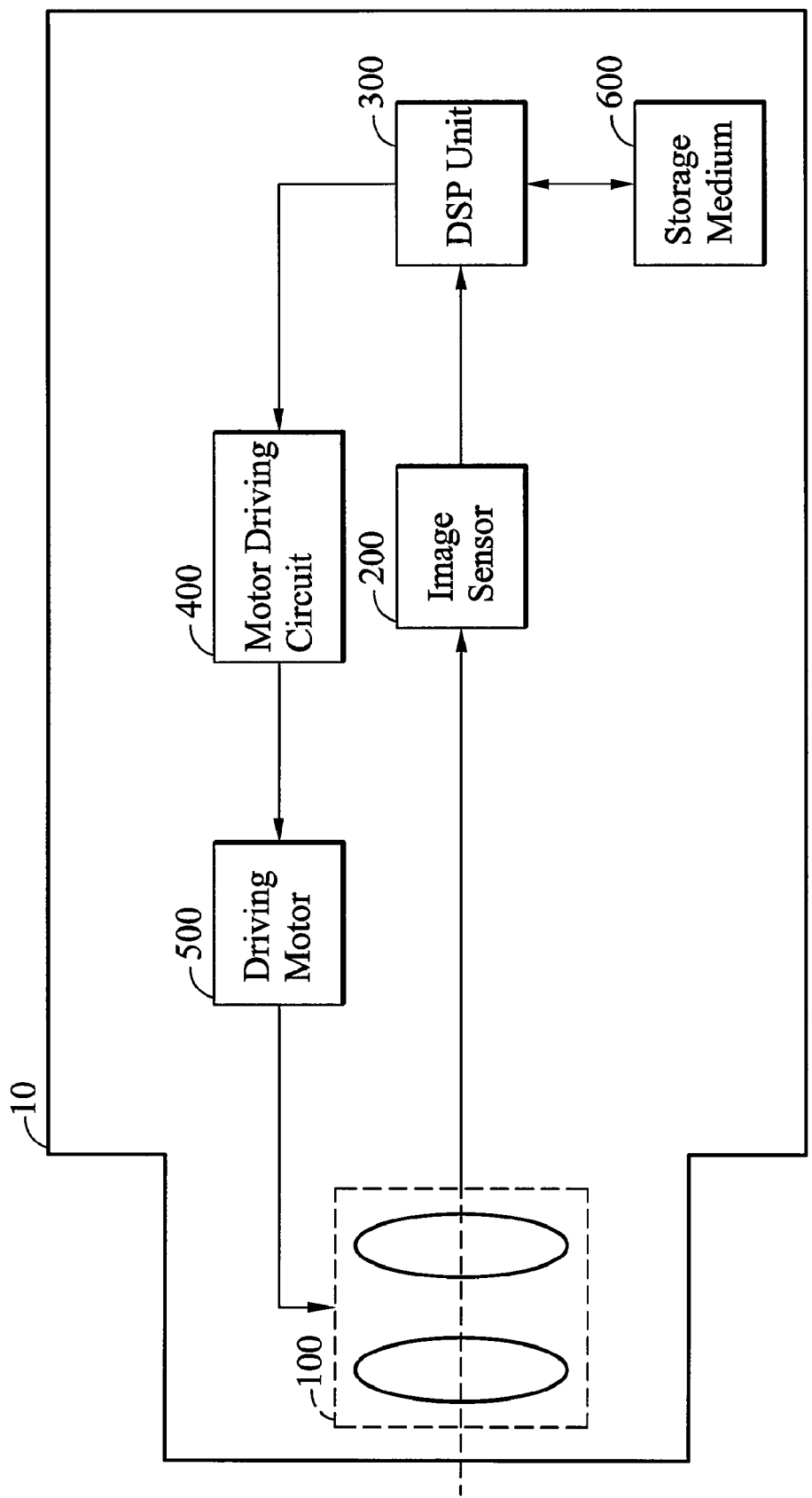
FIG. 3 is a schematic view of an embodiment of an auto focus device.

FIG. 3 is a schematic view of an embodiment of an auto focus device.

Auto focus device 10 comprises a lens module 100, an image sensor 200, a digital signal processing (DSP) unit 300, a motor driving circuit 400, a driving motor 500, and storage medium 600. DSP unit 300 is the kernel of auto focus device 10, collecting image information, storing, calculating, and generating control signals. Lens module 100 and image sensor 200 can be integrated in an image extraction unit.

Figure 4:
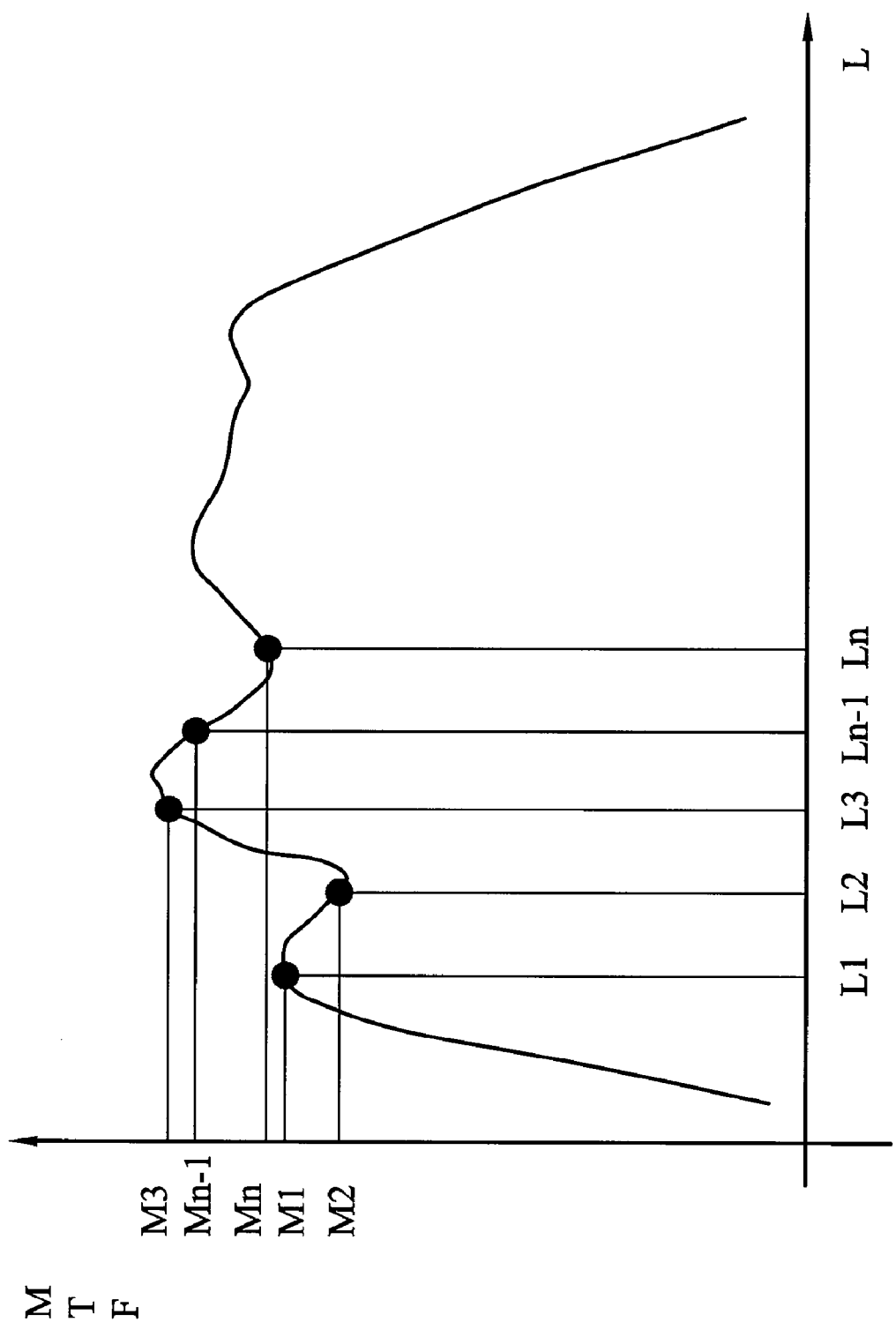
FIG. 4 shows curves for evaluation values and shifting steps.

Referring to FIGS. 3 and 4, DSP unit 300 sends a control command to motor driving circuit 400 to send another control command to driving motor 500, shifting lens module 100 from an initial position (the left side, center, right side, or other positions of a focus track (not shown)) by L1 steps, where L1 is a non-zero integer and is defined as a step length for focus sampling. Image sensor 200 obtains first image data corresponding to the current sampling position through lens module 100. DSP unit 300 generates a first evaluation value M1 based on Modulation Transfer Function (MTF), records first evaluation value M1 in storage medium 600, and transmits a control command to motor driving circuit 400 to send another control command to driving motor 500, shifting lens module 100 by L1 (a non-zero integer) steps, where accumulative steps are L2 and L2=2*L1. Image sensor 200 then obtains second image data corresponding to the current sampling position through lens module 100. DSP unit 300 generates a second evaluation value M2 based on MTF, records second evaluation value M2 in storage medium 600, and so forth.

Next, shifting, obtaining, and generating are repeated to obtain evaluation values (M3, M4, . . . , Mn−1, and Mn) corresponding to each sampling position and step length (L3, L4, . . . , Ln−1, and Ln) for substitution in the following statistical formula:

$$\bar{L} = \frac{\sum_{i=1}^{n} L_i \times M_i}{\sum_{i=1}^{n} M_i},$$

where Mi represents an evaluation value and Li represents a step length at corresponding sampling position. A weighted average for the step length $\bar{L}$, corresponding to an optimum focus position, can thus be obtained according to the obtained evaluation values and step lengths. It is noted that L3=3*L1, L4=4*L1, and so forth, and the value of L1 may be 3, 5, 7, or any other positive integer, which is not limited to the invention.

Another embodiment of an auto focus method first calculates evaluation values for each sampling position and step lengths for a motor, desired evaluation value and corresponding step lengths selected according to the maximum evaluation value, and obtains an optimum focus position by calculating the evaluation values and step lengths using the described formula.

DSP unit 300 sends a control command to motor driving circuit 400 to send another control command to driving motor 500, shifting lens module 100 from an initial position (the left side, center, right side, or other positions of a focus track (not shown)) by L1 steps, where L1 is a non-zero integer and is defined as a step length for focus sampling. Image sensor 200 obtains first image data corresponding to the current sampling position through lens module 100. DSP unit 300 generates a first evaluation value M1 based on Modulation Transfer Function (MTF), records first evaluation value M1 in storage medium 600, and transmits a control command to motor driving circuit 400 to send another control command to driving motor 500, shifting lens module 100 by L1 (a non-zero integer) steps, where accumulative steps are L2 and L2=2*L1. Image sensor 200 then obtains second image data corresponding to the current sampling position through lens module 100. DSP unit 300 generates a second evaluation value M2 based on MTF, records second evaluation value M2 in storage medium 600, and so forth.

The shifting, obtaining, and generating steps are repeated to obtain evaluation values (M3, M4, . . . , Mn−1, and Mn) corresponding to each sampling position and step length (L3, L4, . . . , Ln−1, and Ln). Based on a maximum evaluation value (evaluation value M10 corresponding to step length L10, for example), evaluation values M5~M15 and step lengths L5~L15 corresponding to n (n=5) sampling positions (including the sampling position corresponding to step length L10) prior to and following, respectively, the sampling position corresponding to step length L10 are selected and substituted in the described statistical formula to obtain an optimum focus position.

Figure 5:
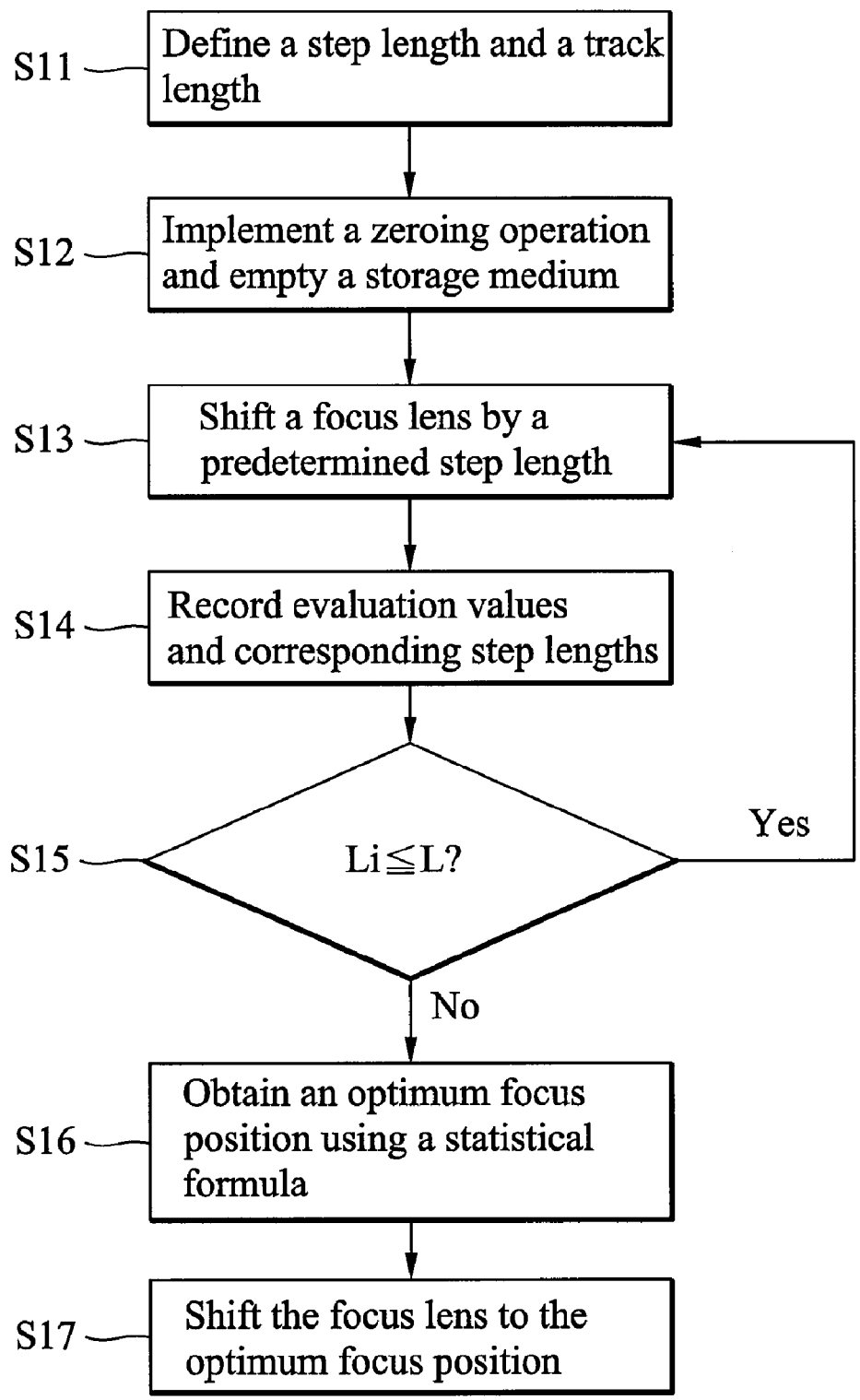
FIG. 5 is a flowchart of an embodiment of an auto focus method.

FIG. 5 is a flowchart of an embodiment of an auto focus method.

A step length S for a driving motor and a track length L for a focus track are defined and a storage medium is provided (step S11). The driving motor is initialized, implemented on a zeroing operation to be moved to an initial position. The driving motor is shifted to, for example, the left or right side of the focus track. The storage medium is cleaned (step S12). Next, the driving motor shifts a focus lens by m steps (as L1 steps described) (step S13) to record an evaluation value (M1 as described) and a step length (L1 as described) corresponding to the current sampling position for a desired image in the storage medium (step S14). It is determined whether the total step length (Li) is less than length L of the focus track (Li≦L?) (step S15). If so, in step S13, the driving motor repeatedly and sequentially shifts the focus lens by m steps (as L1 steps described) to record each evaluation value ((M2, M3, . . . , Mn−1, and Mn as described), each step length (L2, L3, . . . , Ln−1, and Ln as described) corresponding to each sampling position for the desired image in the storage medium.

If not, indicating the focus lens has moved to the end of the focus track (the left or right side) or to the end of the focus track and then returned, the evaluation values ((M1, M2, . . . , Mn−1, and Mn) and step lengths (L1, L2, . . . , Ln−1, and Ln) recorded in the storage medium are substituted in the described statistical formula to generate a weighted average for step lengths for the driving motor, thus obtaining an optimum focus position (step S16). The driving motor then shifts the focus lens to the optimum focus position according to the weighted average (step S17).

Figure 6:
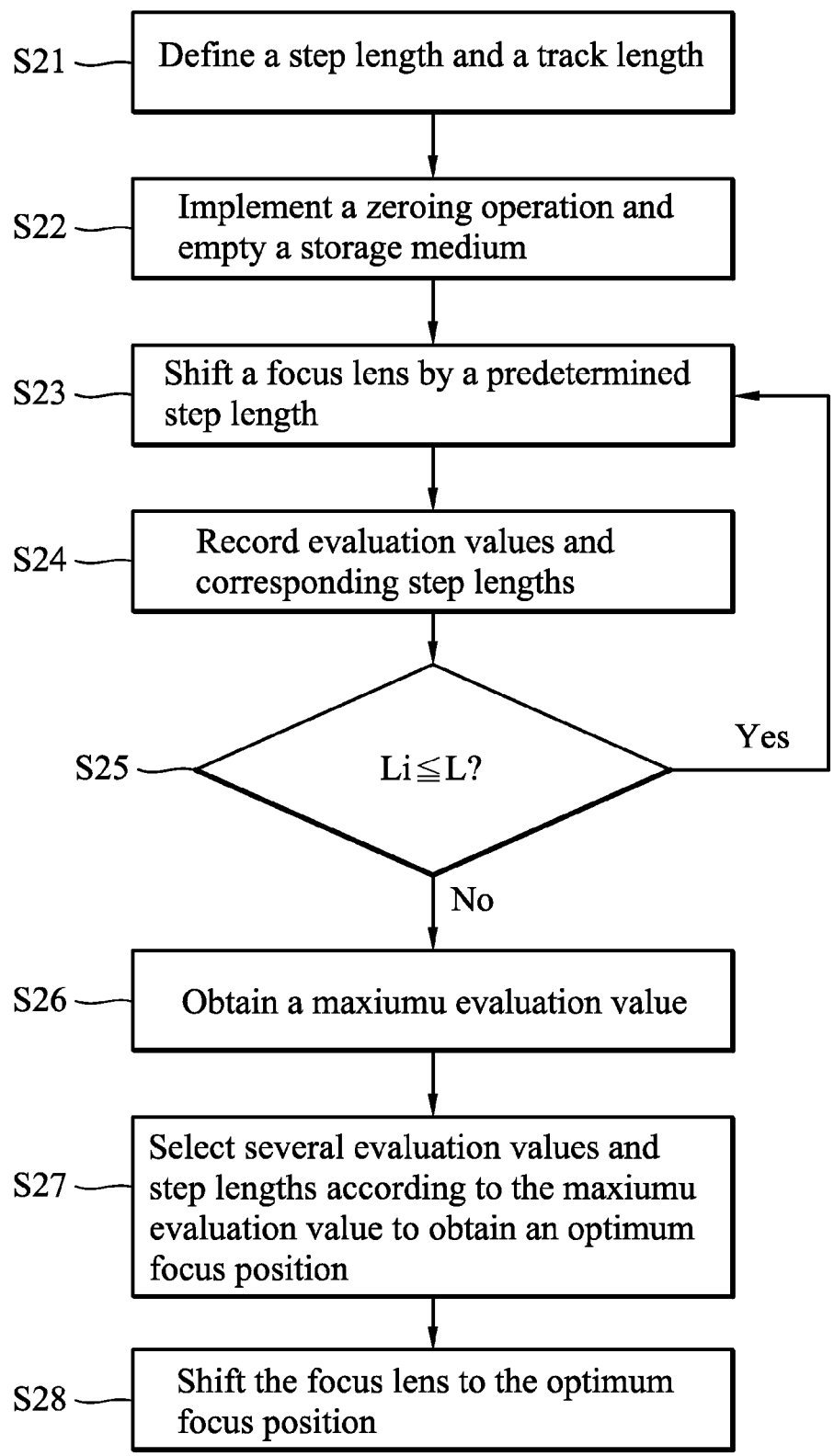
FIG. 6 is a flowchart of a further embodiment of an auto focus method.

FIG. 6 is a flowchart of another embodiment of an auto focus method.

A step length S for a driving motor and a track length L for a focus track are defined and a storage medium is provided (step S21). The driving motor is initialized, implemented on a zeroing operation to be moved to an initial position. The driving motor is shifted to, for example, the left or right side of the focus track. The storage medium is cleaned (step S22). Next, the driving motor shifts a focus lens by m steps (as L1 steps described) (step S23) to record an evaluation value (M1 as described) and a step length (L1 as described) corresponding to the current sampling position for a desired image in the storage medium (step S24). It is determined whether the total step length (Li) is less than length L of the focus track (Li≦L?) (step S25). If so, in step S23, the driving motor repeatedly and sequentially shifts the focus lens by m steps (as L1 steps described) to record each evaluation value (M2, M3, . . . , Mn−1, and Mn as described) and each step length (L2, L3, . . . , Ln−1, and Ln as described) corresponding to each sampling position for the desired image in the storage medium.

If not, indicating the focus lens has moved to the end of the focus track (the left or right side) or to the end of the focus track and then returned, a maximum evaluation value (evaluation value M5 corresponding to step length L5, for example) is obtained according to the evaluation values (M1, M2, . . . , Mn−1, and Mn as described) recorded in the storage medium (step S26). Evaluation values M5~M15 and step lengths L5~L15 corresponding to n (n=5) sampling positions (including the sampling position corresponding to step length L10) prior to and following, respectively, the sampling position corresponding to step length L10 are selected and substituted in the disclosed statistical formula to obtain an optimum focus position (step S27). The driving motor then shifts the focus lens to the optimum focus position (step S28).

An auto focus method of the invention surveys a focus track only once and calculates a weighted average according to obtained evaluation values and step lengths corresponding to each sampling position, achieving fast and accurate auto focus.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An auto focus method, comprising:
   defining a step length for a driving motor and a track length and providing a storage medium;
   shifting the driving motor to an initial position and cleaning the storage medium;
   sequentially shifting a focus lens to a plurality of sampling positions based on the step length using the driving motor and recording a plurality of evaluation values respectively corresponding to each of the sampling positions and a plurality of step lengths respectively corresponding to each of the evaluation values for a desired image in the storage medium;
   calculating a weighted average according to the evaluation values and the step lengths recorded in the storage medium using a statistical formula; and
   shifting the focus lens to a focus position according to the weighted average using the driving motor;
   wherein the statistical formula is:

$$\bar{L} = \frac{\sum_{j=1}^{n} L_i \times M_i}{\sum_{i=1}^{n} M_i},$$

where Mi represents an evaluation value and Li represents a step length at a corresponding sampling position.

2. The auto focus method as claimed in claim 1, wherein shifting the focus lens to the sampling positions further comprises:
   shifting the focus lens to a first sampling position according to step length using the driving motor and recording a first evaluation value corresponding to the first sampling position and a first step length based on the step length for the desired image in the storage medium;
   determining whether the total shift distance is less than the track length;
   if the total shift distance is less than the track length, shifting the focus lens to a subsequent sampling position using the driving motor and recording a subsequent evaluation value corresponding to the subsequent sampling position and a subsequent step length based on the step length for the desired image in the storage medium; and
   if the total shift distance is not less than the track length, calculating the weighted average according to evaluation values and corresponding step lengths recorded in the storage medium using the statistical formula.

3. The auto focus method as claimed in claim 1, wherein recording the evaluation values and calculating the weighted average further comprises:
   recording a plurality of evaluation values corresponding to each sampling position for the desired image in the storage medium;
   selecting a plurality of evaluation values and step lengths corresponding to a predetermined number of sampling positions prior to and following a sampling position, respectively, corresponding to the maximum evaluation value; and
   calculating the weighted average according to the selected evaluation values and step lengths using the statistical formula.

4. An auto focus device, comprising:
   a storage medium;
   a lens module;
   a driving motor, coupled to the lens module, shifting the lens module on a focus track based on a predetermined step length;
   an image sensor, coupled to the lens module, obtaining evaluation values corresponding to a desired image through the lens module; and
   a digital signal processing unit, coupled to the image sensor and the driving motor, shifting the driving motor to an initial position, cleaning the storage medium, sequentially shifting the lens module to a plurality of sampling positions based on the step length using the driving motor, recording a plurality of evaluation values respectively corresponding to each of the sampling positions and a plurality of step lengths respectively corresponding to each of the evaluation values for the desired image in the storage medium, calculating a weighted average according to the evaluation values and the step lengths recorded in the storage medium using a statistical formula, and shifting the focus lens to a focus position according to the weighted average using the driving motor;
   wherein the statistical formula is:

$$\bar{L} = \frac{\sum_{j=1}^{n} L_i \times M_i}{\sum_{i=1}^{n} M_i},$$

where Mi represents an evaluation value and Li represents a step length at a corresponding sampling position.

5. The auto focus device as claimed in claim 4, wherein the digital signal processing unit further shifts the lens module to a first sampling position according to step length using the driving motor, records a first evaluation value corresponding to the first sampling position and a first step length based on the step length for the desired image in the storage medium, determines whether the total shift distance is less than the focus track length, and if the total shift distance is less than the focus track length, shifts the lens module to a subsequent sampling position using the driving motor, records a subsequent evaluation value corresponding to the subsequent sampling position and a subsequent step length based on the step length for the desired image in the storage medium, and, if the total shift distance is not less than the focus track length, calculates the weighted average according to evaluation values and corresponding step lengths recorded in the storage medium using the statistical formula.

6. The auto focus device as claimed in claim 4, wherein the digital signal processing unit further records a plurality of evaluation values corresponding to each sampling position for the desired image in the storage medium, selects a plurality of evaluation values and step lengths corresponding to a predetermined number of sampling positions prior to and following a sampling position, respectively, corresponding to the maximum evaluation value, and calculates the weighted average according to the selected evaluation values and step lengths using the statistical formula.

7. An auto focus method, comprising:
    shifting a lens module to a plurality of sampling positions based on a predetermined step length using a driving motor;
    obtaining a plurality of evaluation values respectively corresponding to each of the sampling positions;
    recording the evaluation values and a plurality of step lengths respectively corresponding thereto to each of the evaluation values;
    assigning a weighted value to each corresponding step length respectively according to the evaluation values; and
    calculating the evaluation values and the weighted step lengths to obtain an optimum focus position;

wherein the optimum focus position is calculated using the following formula:

$$\overline{L} = \frac{\sum_{j=1}^{n} L_i \times M_i}{\sum_{i=1}^{n} M_i},$$

where Mi represents an evaluation value and Li represents a step length at a corresponding sampling position.

8. The auto focus method as claimed in claim 7, wherein shifting the lens module to the sampling positions further comprises:
    shifting the lens module to a first sampling position according to the step length using the driving motor and recording a first evaluation value corresponding to the first sampling position and a first step length based on the step length in the storage medium;
    determining whether the total shift distance is less than the focus track length;
    if the total shift distance is less than the focus track length, shifting the lens module to a subsequent sampling position using the driving motor and recording a subsequent evaluation value corresponding to the subsequent sampling position and a subsequent step length based on the step length in the storage medium; and
    if the total shift distance is not less than the focus track length, calculating the weighted average according to evaluation values and corresponding step lengths recorded in the storage medium.

9. The auto focus method as claimed in claim 7, wherein recording the evaluation values and calculating the weighted average further comprises:
    recording the plurality of evaluation values corresponding to each sampling position in the storage medium;
    selecting the plurality of evaluation values and step lengths corresponding to a predetermined number of sampling positions prior to and following a sampling position, respectively, corresponding to the maximum evaluation value; and
    calculating the weighted average according to the selected evaluation values and step lengths.

* * * * *